United States Patent
Chen et al.

(10) Patent No.: US 12,146,536 B1
(45) Date of Patent: Nov. 19, 2024

(54) METHOD AND SYSTEM FOR A VEHICLE CLUTCH PERFORMANCE DETECTION SYSTEM USING CLUTCH TORQUE AND CLUTCH PRESSURE

(71) Applicant: Ford Global Technologies, LLC, Dearborn, MI (US)

(72) Inventors: Weitian Chen, Windsor (CA); Stuart N. Ford, Seattle, WA (US); Ankit Saini, Novi, MI (US); Qingyu Zhang, Wayne, MI (US); Scott Joseph Gittins, Ann Arbor, MI (US); Zhengyu Dai, Canton, MI (US); Brandon M. Dawson, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/329,786

(22) Filed: Jun. 6, 2023

(51) Int. Cl.
   *F16D 48/06* (2006.01)

(52) U.S. Cl.
   CPC .... *F16D 48/066* (2013.01); *F16D 2500/3024* (2013.01); *F16D 2500/3027* (2013.01); *F16D 2500/3065* (2013.01); *F16D 2500/5023* (2013.01); *F16D 2500/70605* (2013.01); *F16D 2500/7101* (2013.01)

(58) Field of Classification Search
   CPC ........... F16D 48/066; F16D 2500/3024; F16D 2500/3027; F16D 2500/30421; F16D 2500/5018; F16D 2500/50233; F16D 2500/70605; F16D 2500/7104; F16D 2500/7101
   See application file for complete search history.

(56) References Cited

U.S. PATENT DOCUMENTS

| | | | |
|---|---|---|---|
| 8,452,499 B2 | 5/2013 | Lorentz et al. | |
| 8,676,515 B2 | 3/2014 | Long et al. | |
| 10,571,022 B2 | 2/2020 | Meyer et al. | |
| 11,009,091 B2 | 5/2021 | David et al. | |
| 2019/0176798 A1 | 6/2019 | Ford et al. | |
| 2019/0271392 A1 * | 9/2019 | Kamiya | F16D 48/10 |
| 2020/0309256 A1 | 10/2020 | Kim | |
| 2022/0018403 A1 * | 1/2022 | Zhang | F16D 48/066 |

FOREIGN PATENT DOCUMENTS

| | | | | |
|---|---|---|---|---|
| CN | 111947922 A | | 11/2020 | |
| CN | 113700851 A | | 11/2021 | |
| DE | 102016124811 A1 * | 6/2018 | | |
| EP | 1672237 A2 * | 6/2006 | ........... | F16D 48/066 |
| KR | 101558678 B1 | | 10/2015 | |

* cited by examiner

*Primary Examiner* — Timothy Hannon
(74) *Attorney, Agent, or Firm* — Vincent Mastrogiacomo; Brooks Kushman, P.C.

(57) ABSTRACT

A method for controlling a vehicle transmission system having a clutch system includes generating a torque-pressure (T-P) gain deviation based on a T-F characteristic and a nominal T-F characteristic for the clutch system, generating a pressure magnitude deviation based on the set of pressure values and the set of nominal pressure values, determining whether a T-F characteristic deviates from the nominal T-F characteristic based on the T-P gain deviation and the pressure magnitude deviation, identifying the T-F characteristic as deviating in response to the T-F characteristic departing from the nominal transfer characteristic, and issuing a notification regarding the deviating T-F characteristic to perform a corrective action related to the clutch system.

20 Claims, 4 Drawing Sheets

METHOD AND SYSTEM FOR A VEHICLE CLUTCH PERFORMANCE DETECTION SYSTEM USING CLUTCH TORQUE AND CLUTCH PRESSURE

TECHNICAL FIELD

The present disclosure relates to a method and/or system for monitoring performance of a vehicle clutch system.

BACKGROUND

Many vehicles are used over a wide range of vehicle speeds, including both forward and reverse movements. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a higher speed ratio such that it multiplies the engine torque for improved vehicle speed increase. At high vehicle speed, operating the transmission at a lower speed ratio permits an engine speed associated with quiet, fuel efficient cruising.

Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

SUMMARY

In one form, the present disclosure is directed to a method for controlling a vehicle transmission system having a clutch system. The method includes generating a torque-pressure (T-P) gain deviation based on a transfer function characteristic and a nominal transfer function characteristic for the clutch system. The transfer function characteristic includes a set of torque values and a set of pressure values, and the nominal transfer function characteristic includes a set of nominal pressure values and a set of nominal torque values. The method further includes generating a pressure magnitude deviation based on the set of pressure values and the set of nominal pressure values, and issuing a notification indicating the T-F characteristic deviates from the N-T-F characteristic based on the T-P gain and pressure magnitude deviations to perform a corrective action related to the clutch system.

In one form, the present disclosure is directed to a system for controlling a vehicle transmission system having a clutch system. The system comprising one or more computing devices configured to generate a torque-pressure (T-P) gain deviation based on a transfer function characteristic and a nominal transfer function characteristic for the clutch system. The transfer function characteristic includes a set of torque values and a set of pressure values, and the nominal transfer function characteristic includes a set of nominal pressure values and a set of nominal torque values. The one or more computing devices is further configured to generate a pressure magnitude deviation based on the set of pressure values and the set of nominal pressure values; determine whether a T-F characteristic deviates from the N-T-F characteristic based on the T-P gain deviation and the pressure magnitude deviation; and issue a notification regarding the T-F characteristic to perform a corrective action related to the clutch system in response to the T-F characteristic deviating from the N-T-F characteristic.

In one form, the present disclosure is directed to a system for controlling a vehicle transmission system having a clutch system. The system includes one or more computing devices configured to generate a torque-pressure (T-P) gain deviation based on a transfer function characteristic and a nominal transfer function characteristic for the clutch system. The transfer function characteristic includes a set of torque values and a set of pressure values, and the nominal transfer function characteristic includes a set of nominal pressure values and a set of nominal torque values. The one or more computing devices is further configured to generate a pressure magnitude deviation based on the set of pressure values and the set of nominal pressure values; detect the T-F characteristic as a deviating T-F characteristic that departs from the N-T-F characteristic based on the T-P gain deviation and the pressure magnitude deviation; and adjust a transmission control algorithm to have the clutch system operate within the N-T-F characteristic in response to the T-F characteristic being identified as deviating.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
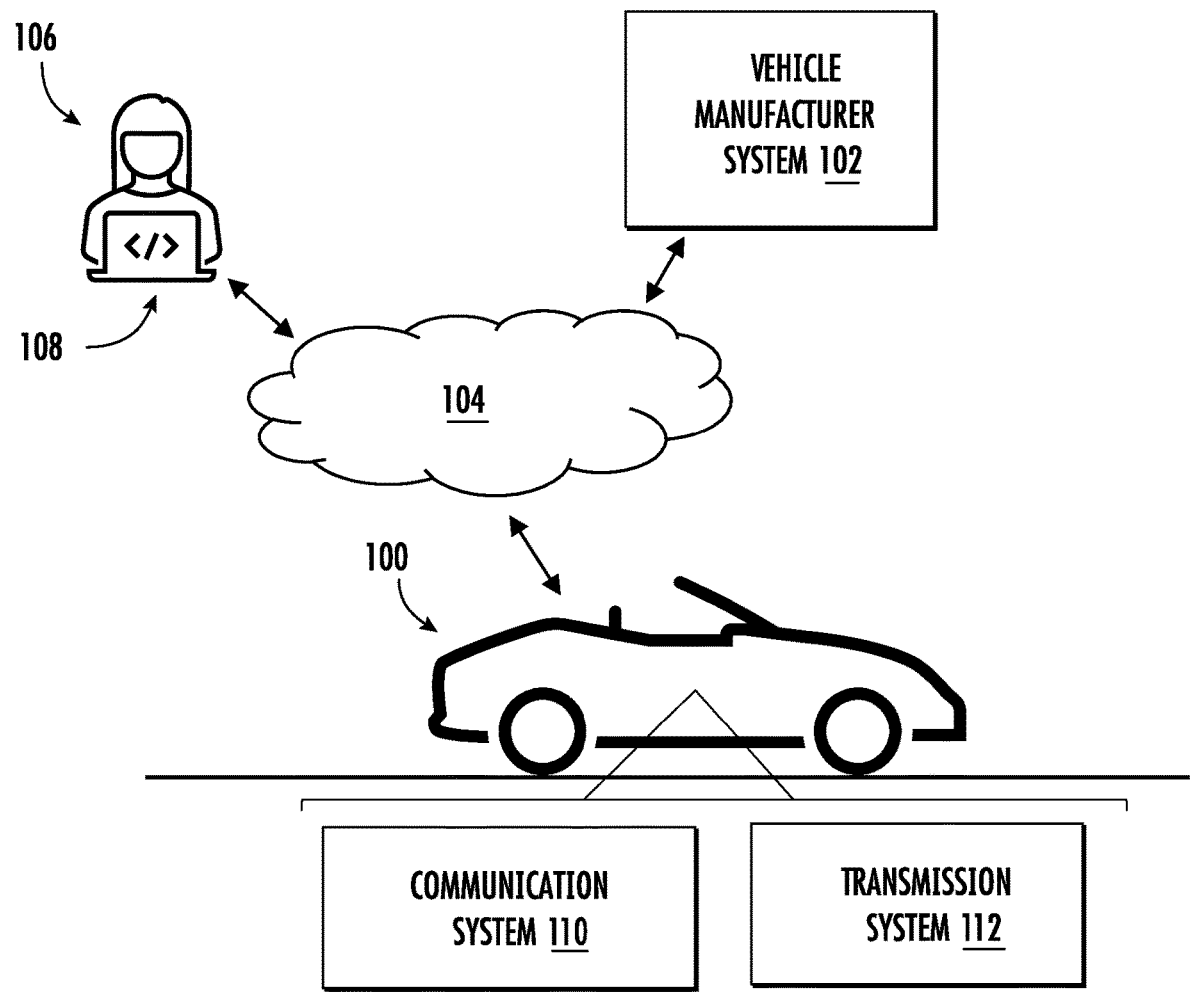
FIG. 1 illustrates a vehicle communicating with a vehicle manufacturer system in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Data collected by vehicles can be employed to detect and identify deviating performance issues in components/systems within a vehicle prior to the deviating performance affecting, for example, a drive experience or physical components in the vehicle. As detailed herein, the present disclosure is directed to a clutch performance detection system configured to monitor performance of a clutch system in the vehicle based on data collected by the vehicle. Specifically, the clutch performance detection system employs two metrics for analyzing a clutch transfer function that provides existing torque-pressure correlation of the clutch system. If the clutch performance detection system detects deviating performance of the clutch system, a corrective action may be taken to address the cause of the deviating performance, and thus, address potential shift quality issues.

Referring to FIG. 1, in one form, a vehicle 100 is configured to exchange information with a vehicle manufacturer system 102 via a wireless communication network 104. More particularly, vehicle manufacturer system 102 may receive and store information related to the operation and/or performance of the vehicle 100 and other vehicles.

In some applications, the vehicle manufacturer system 102 uses the information from multiple vehicles (e.g., 100 vehicles, 10,000 vehicles, etc.) to monitor performance and, if applicable, identify potential performance issues of the vehicles. Specifically, the information may be analyzed to determine whether the vehicle(s) is operating within one or more nominal performance characteristics. In a non-limiting example, a technical specialist 106 may access the information in the vehicle manufacturer system 102 via a computing device 108 and the network 104. The technical specialist 106 may review the information related to deviating performance characteristics to identify a source of the deviating performance and provide a corrective action. In addition to or in lieu of the technical specialist 106, a neural network may be provided at the vehicle manufacturer system 102 to identify the deviating performance of the vehicles, the source of the deviating performance, and/or suggest remedies for addressing the deviating performance. Among other components, the vehicle manufacturer system 102 may include one or more servers configured to store and process information related to a plurality of vehicles.

In one form, the vehicle 100 includes a communication system 110 and a transmission system 112. The communication system 102 is configured to communicate with modules within the vehicle 100 and with external devices/systems such as the vehicle manufacturer system 102 Accordingly, the communication system 102 may include hardware components (e.g., modem, router, transceivers, input-output interfaces, wires) and software protocols for establishing communication with modules within the vehicle 100 and with the wireless communication network 104.

Figure 2:
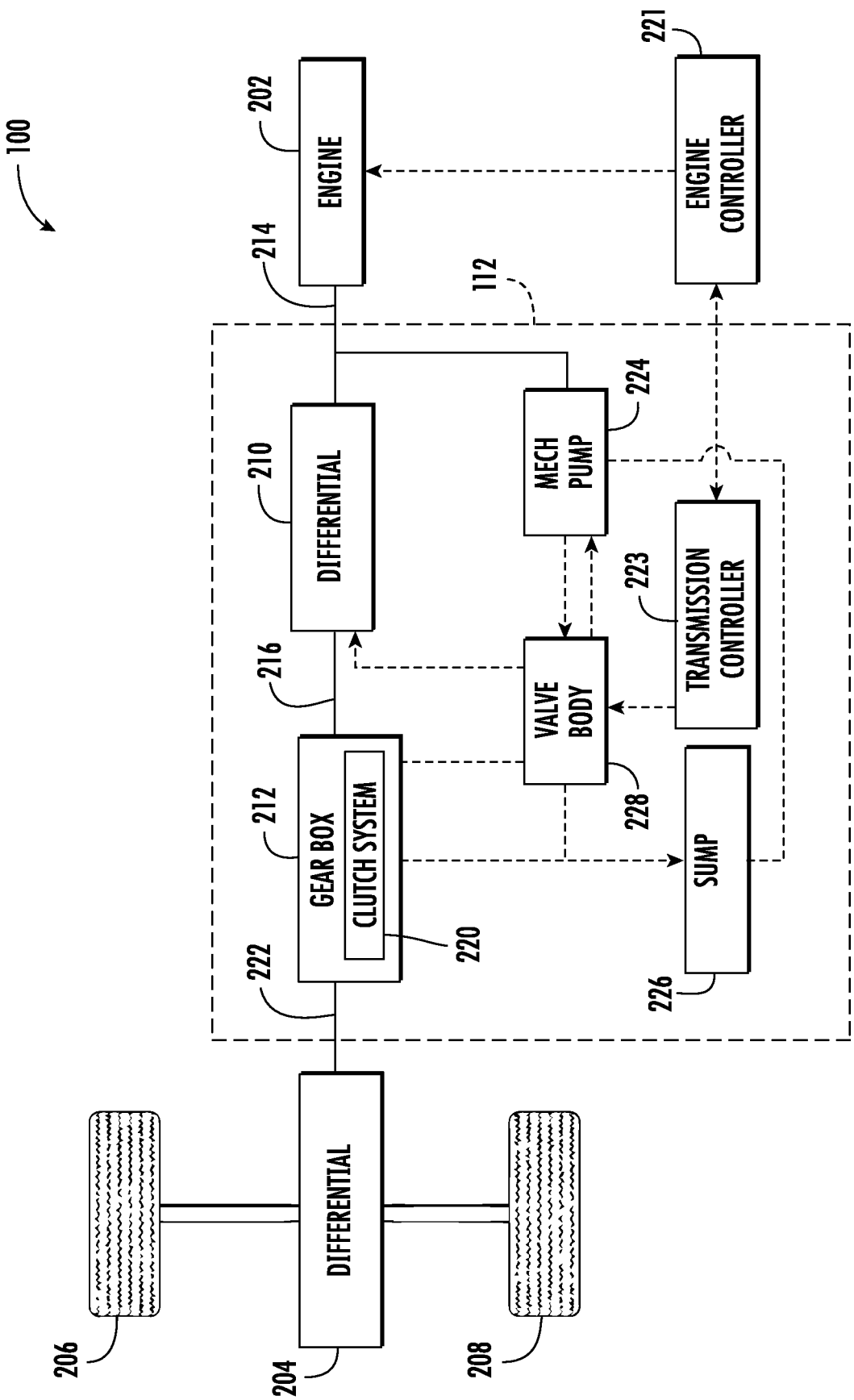
FIG. 2 is a block diagram of the vehicle of FIG. 1 in accordance with the present disclosure.

Referring to FIG. 2, a non-limiting example of the transmission system 112 is provided. In FIG. 2, solid lines represent mechanical power flow connections; dashed lines represent the flow of hydraulic fluid or information signals. Power is provided by an actuator, such as internal combustion engine 202 or an electric motor (not shown). The transmission system 112 adjusts the torque and speed to satisfy demands of the vehicle 100 and deliver the power to a differential 204 The differential 204 transmits the power to left and right rear wheels 206 and 208, permitting slight speed differences as the vehicle turns a corner.

The transmission system 112 includes a torque converter 210 and a gearbox 212. The torque converter 210 transmits torque hydrodynamically based on a speed difference between an impeller that is driven by a crankshaft 214 and a turbine that drives a gearbox input shaft 216 (sometimes called a turbine shaft or a transmission input shaft). Power is transmitted from the impeller to the turbine via moving fluid whenever the impeller rotates faster than the turbine.

The gearbox 212 includes gearing and shift elements such as a clutch system 220, configured to establish various power flow paths between the input shaft 216 and the output shaft 222. The term "clutch" is used generically herein to describe shift elements that couple two rotating components and to describe shift elements that couple a rotating component to a fixed component, such as a housing. Each power flow path may be established by engaging an associated subset of the shift elements. at low vehicle speed, a power flow path providing torque multiplication and speed reduction between the input shaft 216 and the output shaft 222 may be established to optimize vehicle performance. At higher vehicle speeds, a power flow path providing speed multiplication may be established to minimize fuel consumption.

In a non-limiting example, clutches of the clutch system 220 are engaged by supplying hydraulic fluid at an elevated pressure to a clutch apply chamber (not shown). The clutch system 220 may include a clutch pack having friction plates splined to one component and interleaved with separator plates splined to a different component. The fluid forces a piston to squeeze the clutch pack such that frictional force between the friction plates and the separator plates couples the components. The torque capacity of each clutch varies in proportion to changes in the fluid pressure.

The vehicle 100 further includes an engine controller 221 and a transmission controller 223 in communication with the engine controller 221. The engine controller 221 is configured to adjust various actuators in the engine 202 to control the level of torque delivered at the crankshaft 214. For example, the engine controller 221 may adjust a throttle opening, fuel injection quantity and timing, spark timing, camshaft timing, or the like. The engine controller 221 may determine the desired level of wheel torque predominantly based on driver input via a pedal (not shown). The engine controller 221 may adjust the torque output or speed based on requests from the transmission controller 223.

A pump 224, driven by the crankshaft 214 or electrically, draws fluid from the sump 226 and delivers fluid at an elevated pressure to a valve body 228. The valve body 228 delivers the fluid to the clutch apply chambers at a pressure (i.e., a clutch pressure) controlled in accordance with signals from the transmission controller 234. In addition to the fluid provided to the apply chambers, the valve body 228 provides fluid for lubrication and for the torque converter 210. The fluid eventually drains from the gearbox 212 back to the sump 226 at ambient pressure.

Pressure sensors may be provided to measure the fluid pressure in the clutch apply chambers and report the pressure to the transmission controller 223. During shifting, the amount of pressure may be used by the transmission controller 223 to set or determine the clutch torque using a predefined transmission control algorithm.

A relatively smooth release or engagement of the clutches of the clutch system 220 may be controlled based on a relationship between clutch pressure and clutch torque. That is, the transmission controller 223 may employ a clutch transfer function (T-F) associating desired clutch torque with a clutch pressure believed to provide the respective desired clutch torque. The defined T-F may affect the shift quality of the clutch system, and thus, the transmission system 112.

In some applications, a T-F(s) for the clutch system is modeled as linear functions between clutch torque and clutch pressure. However, nonlinearities do exist, and real-world clutch systems may behave non-linearly. In addition, clutch-to-clutch variations, wear, and/or aging are common and can also affect shift quality.

In one form, the present disclosure provides a clutch performance detection system that analyzes a clutch T-F characteristic that includes a set of torque values and a set of pressure values, where each torque value is associated with a pressure value. In a non-limiting example, referring to FIG. 3, a clutch engagement (on-coming) chart 300 illustrates a T-F characteristic 304 that provides a relationship between torque and pressure. In this example, the T-F characteristic 304 includes 12 data points detected by the transmission system 112, and the 12 data points are connected by 11 linear segments. While the chart 300 illustrates 12 data points, the T-F characteristic may include two or more data points having different values, and should not be limited to the example provided herein.

Figure 3:
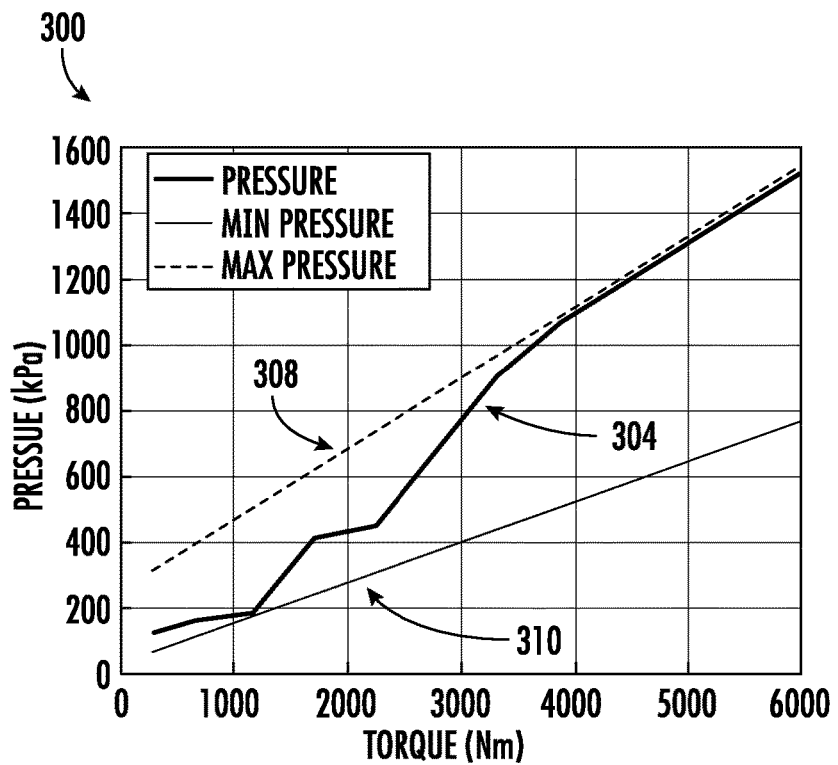
FIG. 3 is a graph of an example transfer function characteristic of a clutch system during clutch engagement in accordance with the present disclosure.

In FIG. 3, the clutch engagement chart 300 illustrates a minimum pressure characteristic 308 and a maximum pressure characteristic 310 (i.e., collectively "nominal T-F characteristics 308, 310") for the clutch system 220. The T-F characteristic 304 of the clutch system 220 should be provided between the min-max pressure characteristics 308, 310. As illustrated a nominal T-F characteristic includes a set of nominal pressure values and a set of nominal torque values correlated with the nominal pressure values.

As described herein, the clutch performance detection system defines two metrics to detect deviation in the T-F characteristics. Specifically, the clutch performance detection system evaluates segment slopes and pressure magnitude of a T-F characteristic detected by the transmission system.

Figure 4:
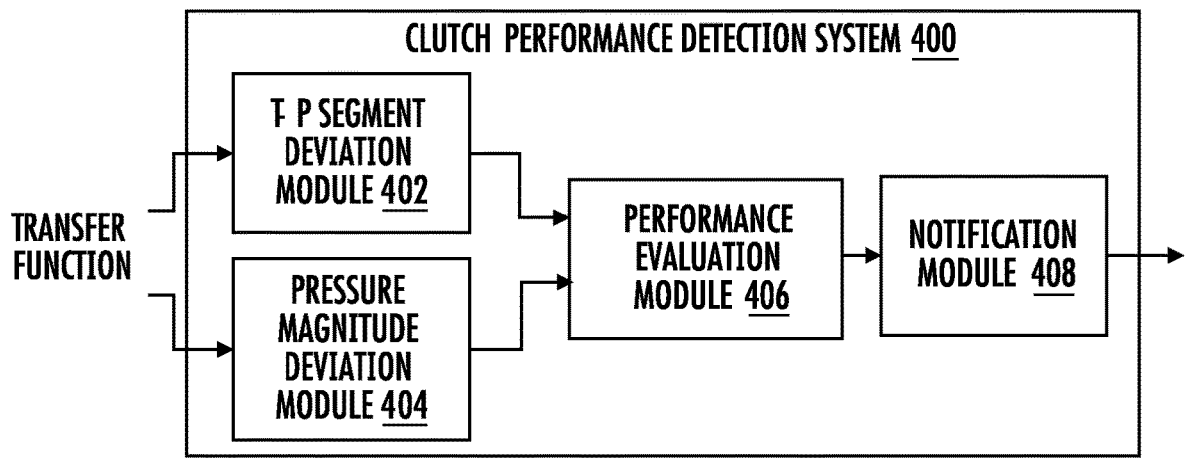
FIG. 4 is a block diagram of a clutch performance detection system in accordance with the present disclosure.
Figure 5:
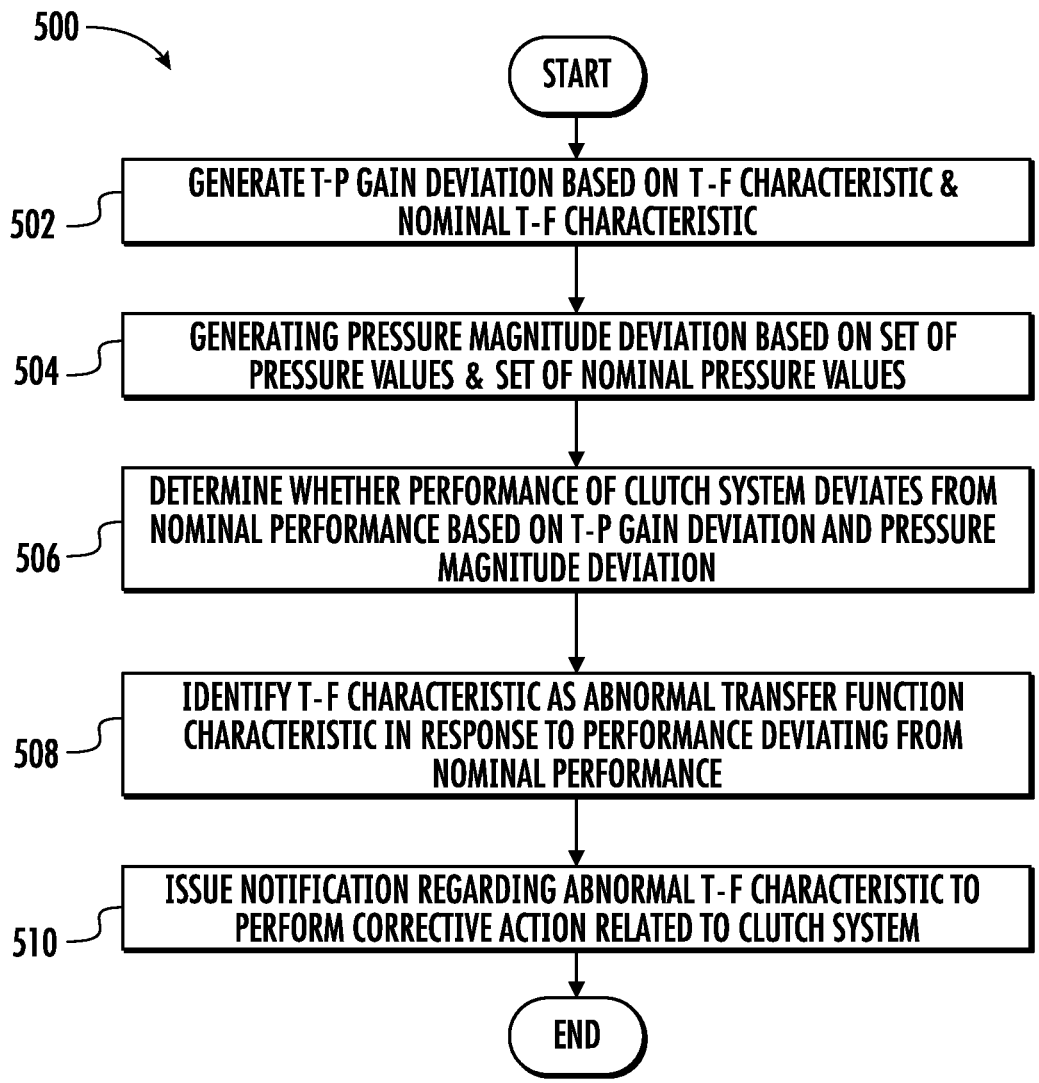
FIG. 5 is a flowchart of a clutch performance detection routine in accordance with the present disclosure.

Referring to FIGS. 4 and 5, a clutch performance detection system 400 includes a torque-pressure (T-P) segment deviation module 402, a pressure magnitude deviation module 404, a performance evaluation module 406, and a notification module 408. FIG. 5 illustrates an example clutch performance detection routine 500 performed by the clutch performance detection system 400.

The T-P segment deviation module 402 is configured to evaluate correlation between torque and pressure provided in the T-F characteristic based on a nominal T-F associated with the clutch system. More particularly, at 502, the T-P segment deviation module 402 is configured to generate a T-P gain deviation by generating a plurality of T-P segment slopes based on the set of torque values and the set of pressure values. For example, equation 1 provides a T-P segment slope ($k_{T2P}$) for each segment ("s") between data points i and i+1 (i.e., $1 \leq i \leq I$, I is number of data points). In equation 1, "$P_{cl}$" is clutch pressure and "$T_{cl}$" is clutch torque from the T-F characteristic. Similarly, a plurality of T-P segment slopes is generated for the nominal T-F characteristics (i.e., $k_{T2P,base}$). In a non-limiting example, the nominal T-F characteristics may be based on one of the minimum pressure characteristic 308, the maximum pressure characteristic 310, or both the min-max pressure characteristics 308, 310 (e.g., average). In a non-limiting example, the nominal T-F characteristics may be determined via testing of the clutch system and/or computer aided modeling of the clutch system.

$$k_{T2P,s} = \frac{P_{cl,i+1} - P_{cl,i}}{T_{cl,i+1} - T_{cl,i}} \qquad \text{Equation 1}$$

The T-P segment deviation module 402 is further configured to generate a T-P gain ratio for each T-P segment slope using the associated nominal T-P segment slope (e.g., torque values of associated segment slopes are same). Specifically, equation 2 provides a T-P gain ratio for a segment s ($k_{ratio,s}$), which is a ratio of the T-P segment slope of the clutch transfer function (i.e., $k_{T2P,s}$; an adapted gain) and the T-P segment slope of the nominal T-F characteristic (i.e., $k_{T2P,base,s}$; a nominal gain).

$$k_{ratio,s} = \frac{k_{T2P,s}}{k_{T2P,base,s}} \qquad \text{Equation 2}$$

Using, the T-P gain ratio, the T-P segment deviation module 402 is configured to determine a T-P gain deviation ($k_{ratio,FD,s}$) for each segment using equation 3 in which "$\alpha$" is a selectable constant. For example, $\alpha$ is set to 2.75.

$$k_{ratio,FD,s} = \frac{\ln k_{ratio,s}}{\ln \alpha} \qquad \text{Equation 3}$$

From among the T-P gain deviations for the segments, the T-P segment deviation module 402 is configured to identify a deviating T-P gain ratio based on a T-P gain ratio threshold and determine a number of deviating T-P gain ratios identified. In a non-limiting example, the T-P segment deviation module 402 determines that a T-P gain deviation is deviating when a magnitude of the T-P gain deviation is greater than 1, (i.e., $|k_{ratio,FD,s}|>1$).

In one form, the T-P segment deviation module 402 provides the number of deviating T-P gain ratios to the performance evaluation module 406 as the T-P gain deviation. The total number of T-P gain ratios is the number of segments of the T-F characteristic.

The pressure magnitude deviation module 404 is configured to generate a pressure magnitude deviation for each pressure value of the T-F characteristics based on a set of nominal pressure values (at 504 of FIG. 5). More particularly, the pressure magnitude deviation module 404 generates, for each pressure value, a pressure distance ratio based on one or more nominal pressure values associated with the pressure value (e.g., torque values associated with the one or more nominal pressure values and pressure value are same). For example, the pressure distance ratio is indicative of the distance a pressure value is from a minimum pressure ($P_{min,i}$) (i.e., a min nominal pressure) and a maximum pressure ($P_{max,i}$) (i.e., a max nominal pressure), and may be determined using equation 4 for a selected torque value. In some applications, to increase detectability of additional deviating occurrences, the minimum pressure characteristic and the maximum pressure characteristic are adjusted to reduce the gap between the two characteristics, and thus, a tolerance range for pressure values of the T-F characteristics measured by the vehicle 100. The adjusted minimum and maximum pressure characteristics are employed as the nominal T-F characteristics.

$$d_{ratio,i} = 2\frac{P_{cl,i} - P_{min,i}}{P_{max,i} - P_{min,i}} - 1 \qquad \text{Equation 4}$$

Using the pressure distance ratio, the pressure magnitude deviation module 404 identifies a deviating pressure ratio based on a pressure gain threshold, and determines a number of deviating pressure ratios identified. In a non-limiting example, a pressure distance ratio is identified as being deviating when a magnitude of the pressure distance ratio is greater than 1 (i.e., $|d_{ratio,i}|>1$).

In one form, the pressure magnitude deviation module 404 provides the number of deviating pressure distance ratios to the performance evaluation module 406 as the pressure magnitude deviation. The total number of pressure distance ratios is the number of data values provided in the transfer characteristic.

The performance evaluation module 406 is configured to determine whether a performance characteristic of the clutch system deviates from a nominal performance characteristic based on the T-P gain deviation and the pressure magnitude deviation (at 506 of FIG. 5). More particularly, the performance evaluation module 406 is configured to determine a total deviation of the transfer function characteristic as a summation the T-P gain deviation and the pressure magnitude deviation. Accordingly, the total deviation may be a value between 0 and (I+S), where is "I" is total number of data points and "S" is total number of segments (i.e., I-1).

The performance evaluation module 306 is configured to determine or identify the T-F characteristic of the clutch system as deviating from the nominal T-F characteristic when the total deviation is greater than or equal to a deviation threshold (at 508 of FIG. 5). In some applications, the deviation threshold is set based on experimental data or computer-aided modeling that indicates acceptable number of deviations for the clutch system.

The notification module 408 is configured to issue a notification regarding the deviating T-F characteristic, and thus, deviating performance, of the clutch system to perform a corrective action related to the clutch system (at 510 of FIG. 5). The notification includes identification information identifying the clutch system and performance information indicative of at least the deviating transfer function.

The corrective action may include determining whether the deviating performance is due to physical component of the vehicle or a software related issue. The corrective action may also include issuing a clutch maintenance request to an owner of the vehicle having the clutch system to address the physical component/software related issue. For example, the corrective action may include updating a software application related to controlling the clutch system, such as the transmission control algorithm, so that the T-F characteristics of the clutch system are maintained within the nominal characteristic, which improves shift quality of the clutch system and reduces wear on the clutch system.

Using two different metrics, the clutch performance detection system 400 of the present disclosure is configured to effectively detect an deviating T-F characteristic and thus, an deviating performance in a clutch system. For example, referring to FIG. 3, the slope of the segments of the T-F characteristics between about 1500-300 Nm appears to be uncharacteristic of the slope provided by lines 308 and 310, however, the pressure magnitude may be sufficient since the pressure is between the min and max pressure values. On the other hand, the slope of the segments between 4000-6000 Nm appear to align with the slope of the segments for line 308, but the pressure values at 4000-6000 Nm is very close to the max pressure, which may be uncharacteristic of the clutch system. Using these two metrics and defined thresholds the entire T-F characteristic 304 is analyzed to assess the performance of the clutch system.

The clutch performance detection system 400 may be configured to obtain and analyze a T-F characteristic periodically and/or based on a request from the vehicle manufacturer system 102/technical specialist 106.

The clutch performance detection system 400 may be provided at the vehicle, the vehicle manufacturer system 102, or a combination of both the vehicle 100 and the vehicle manufacturer system 102. For example, the clutch performance detection system 400 may be provided as part of a controller of the vehicle 100, such as but not limited to, the transmission controller. If the transfer function is deviating, the vehicle 100 transmits a data packet including the notification and, in some applications, the T-F characteristic. Once obtained, the vehicle manufacturer system 102 may store the information in a record associated with the vehicle and flag the vehicle as having a deviating T-F characteristic. A technician may then analyze the data to determine a corrective action for the clutch system having the deviating T-F characteristic, such as adjusting the transmission control algorithm to have the T-F characteristic of the vehicle within the nominal T-F characteristic. In some applications, a notification may also be provided to a user of the vehicle via an infotainment system of the vehicle or a vehicle software application.

In another example, the vehicle manufacturer system 102 includes the clutch performance detection system 400 and obtain T-F characteristic from the vehicle 100, and other vehicles. The vehicle manufacturer system 102 stores information related to the nominal T-F characteristic for the vehicle, or alternatively, the vehicle 100 provides the nominal T-F characteristic to the vehicle manufacturer system 102. The vehicle manufacturer system 102 may issue a notification for flagging the record associated with the vehicle and/or transmit a message to an engineering department for further review.

In yet another example, the vehicle 100 may be configured to generate and transmit the T-P gain deviation and the pressure magnitude deviation to the vehicle manufacturer system 102, which then determines if the T-F characteristic is deviating based on the T-P gain and pressured magnitude deviations received.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

In this application, the term "controller" and/or "module" may refer to, be part of, or include: a computing device; an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling a vehicle transmission system having a clutch system, the method comprising:
    generating a torque-pressure (T-P) gain deviation based on a transfer function (T-F) characteristic and a nominal (N-T-F) characteristic for the clutch system, wherein the T-F characteristic includes a set of torque values and a set of pressure values, and the N-T-F characteristic includes a set of nominal pressure values and a set of nominal torque values;
    generating a pressure magnitude deviation based on the pressure values and nominal pressure values; and
    issuing a notification indicating the T-F characteristic deviates from the N-T-F characteristic based on the T-P gain and pressure magnitude deviations to perform a corrective action related to the clutch system.

2. The method of claim 1, wherein each torque value from the set of torque values is associated with a pressure value from the set of pressure values.

3. The method of claim 1, further comprising determining a total deviation of the T-F characteristic as a summation of the T-P gain deviation and the pressure magnitude deviation, wherein the T-F characteristic is determined to deviate from the N-T-F characteristic when the total deviation is greater than or equal to a deviation threshold.

4. The method of claim 1, wherein the generating the T-P gain deviation further comprises:
    generating a plurality of T-P segment slopes based on the torque values and the pressure values of the T-F characteristic;
    generating a T-P gain ratio for each T-P segment slope of the plurality of T-P segment slopes based on a selected nominal T-P segment slope among a plurality of nominal T-P segment slopes; and
    determining the T-P gain deviation based on the T-P gain ratios.

5. The method of claim 4 further comprising:
    identifying a deviating T-P gain ratio from among the T-P gain ratios based on a T-P gain ratio threshold; and
    determining a number of deviating T-P gain ratios identified, wherein the T-P gain deviation is based on the number of deviating T-P gain ratios.

6. The method of claim 1, wherein the generating the pressure magnitude deviation further comprises:
    generating, for each pressure value, a pressure distance ratio based on the pressure value and a nominal pressure value associated with the pressure value, wherein the nominal pressure value is selected among the set of nominal pressure values; and
    determining the pressure magnitude deviation based on the pressure distance ratios for the set of pressure values.

7. The method of claim 6 further comprising:
    identifying a deviating pressure ratio from among the pressure ratios based on a pressure gain threshold; and
    determining a number of deviating pressure ratios identified, wherein the pressure magnitude deviation is based on the number of deviating pressure ratios.

8. The method of claim 1, wherein the notification includes identification information identifying the clutch system and performance information indicating the T-F characteristic deviates from the N-T-F characteristic.

9. The method of claim 1 further comprises issuing a clutch maintenance request to an owner of a vehicle having the clutch system, as the corrective action.

10. The method of claim 1, wherein:
    the generating the T-P gain deviation further comprises:
        generating a plurality of T-P segment slopes based on the set of torque values and the set of pressure values;
        generating a T-P gain ratio for each T-P segment slope of the plurality of T-P segment slopes based on a selected nominal T-P segment slope among a plurality of nominal T-P segment slopes;
        identifying a deviating T-P gain ratio from among the T-P gain ratios based on a T-P gain ratio threshold; and
        determining a number of deviating T-P gain ratios identified, wherein the T-P gain deviation is based on the number of deviating T-P gain ratios, and
    the generating the pressure magnitude deviation further comprises:
        generating, for each pressure value, a pressure distance ratio based on the pressure value and a nominal pressure value associated with the pressure value, wherein the nominal pressure value is selected among the set of nominal pressure values;
        identifying a deviating pressure distance ratio from among the pressure ratios based on a pressure gain threshold; and
        determining a number of deviating pressure distance ratios identified, wherein the pressure magnitude deviation is based on the number of deviating pressure ratios.

11. The method of claim 10 further comprising:
    determining a total deviation of the T-F characteristic as a summation of the number of deviating T-P gain ratios and the number of deviating pressure ratios, wherein:
    wherein the T-F characteristic is determined to deviate from the N-T-F characteristic when the total deviation is greater than or equal to a deviation threshold.

12. A system for controlling a vehicle transmission system having a clutch system, the system comprising:
    one or more computing devices configured to:
        generate a torque-pressure (T-P) gain deviation based on a transfer function (T-F) characteristic and a nominal (N-T-F) characteristic for the clutch system, wherein the T-F characteristic includes a set of torque values and a set of pressure values, and the N-T-F characteristic includes a set of nominal pressure values and a set of nominal torque values;

generate a pressure magnitude deviation based on the set of pressure values and the set of nominal pressure values;

determine whether a T-F characteristic deviates from the N-T-F characteristic based on the T-P gain deviation and the pressure magnitude deviation; and issue a notification regarding the T-F characteristic to perform a corrective action related to the clutch system in response to the T-F characteristic deviating from the N-T-F characteristic.

13. The system of claim 12, wherein each torque value from the set of torque values is associated with a pressure value from the set of pressure values.

14. The system of claim 12, wherein to determine whether the T-F characteristic deviates from the N-T-F characteristic, the one or more computing devices is further configured to:
determine a total deviation of the T-F characteristic as a summation of the T-P gain deviation and the pressure magnitude deviation; and
the T-F characteristic is determined to deviate from the N-T-F characteristic when the total deviation is greater than or equal to a deviation threshold.

15. The system of claim 12, wherein to generate the T-P gain deviation, the one or more computing devices is further configured to:
generate a plurality of T-P segment slopes based on the set of torque values and the set of pressure values;
generate a T-P gain ratio for each T-P segment slope of the plurality of T-P segment slopes based on a selected nominal T-P segment slope among a plurality of nominal T-P segment slopes;
identify a deviating T-P gain ratio from among the T-P gain ratios based on a T-P gain ratio threshold; and
determine a number of deviating T-P gain ratios identified, wherein the T-P gain deviation is based on the number of deviating T-P gain ratios.

16. The system of claim 12, wherein to generate the pressure magnitude deviation, the one or more computing devices is further configured to:
generate, for each pressure value, a pressure distance ratio based on the pressure value and a nominal pressure value associated with the pressure value, wherein the nominal pressure value is selected among the set of nominal pressure values;
identify a deviating pressure distance ratio from among the pressure ratios based on a pressure gain threshold; and
determine a number of deviating pressure distance ratios identified, wherein the pressure magnitude deviation is based on the number of deviating pressures.

17. The system of claim 12, wherein the notification includes identification information identifying the clutch system and performance information indicative of at least the deviating T-F characteristic.

18. The system of claim 12, wherein the one or more computing devices is further configured to issue a clutch maintenance request to an owner of a vehicle having the clutch system, as the corrective action.

19. The system of claim 12, wherein:
to generate the T-P gain deviation, the one or more computing devices is further configured to:
generate a plurality of T-P segment slopes based on the set of torque values and the set of pressure values;
generate a T-P gain ratio for each T-P segment slope of the plurality of T-P segment slopes based on a selected nominal T-P segment slope among a plurality of nominal T-P segment slopes;
identify a deviating T-P gain ratio from among the T-P gain ratios based on a T-P gain ratio threshold; and
determine a number of deviating T-P gain ratios identified, wherein the T-P gain deviation is based on the number of deviating T-P gain ratios;
to generate the pressure magnitude deviation, the one or more computing devices is further configured to:
generate, for each pressure value, a pressure distance ratio based on the pressure value and a nominal pressure value associated with the pressure value, wherein the nominal pressure value is selected among the set of nominal pressure values;
identify a deviating pressure distance ratio from among the pressure ratios based on a pressure gain threshold;
determine a number of deviating pressure distance ratios identified, wherein the pressure magnitude deviation is based on the number of deviating pressures; and
the one or more computing devices is further configured to determine a total deviation of the T-F characteristic as a summation of the number of deviating T-P gain ratios and the number of deviating pressure ratios, wherein the T-F characteristic is determined to deviate from the N-T-F characteristic when the total deviation is greater than or equal to a deviation threshold.

20. A system for controlling a vehicle transmission system having a clutch system, the system comprising:
one or more computing devices configured to:
generate a torque-pressure (T-P) gain deviation based on transfer function (T-F) characteristic and a nominal (N-T-F) characteristic the clutch system, wherein the T-F characteristic includes a set of torque values and a set of pressure values, and the N-T-F characteristic includes a set of nominal pressure values and a set of nominal torque values;
generate a pressure magnitude deviation based on the set of pressure values and the set of nominal pressure values;
detect the T-F characteristic as a deviating T-F characteristic that departs from the N-T-F characteristic based on the T-P gain deviation and the pressure magnitude deviation; and
adjust a transmission control algorithm to have the clutch system operate within the N-T-F characteristic in response to the T-F characteristic being identified as deviating.

* * * * *